Patented Oct. 16, 1945

2,386,982

UNITED STATES PATENT OFFICE 2,386,982

ALKYLATION OF AROMATIC COMPOUNDS

Raymond E. Schaad, Chicago, Ill., assignor to Universal Oil Products Company, Chicago, Ill., a corporation of Delaware No Drawing. Application February 20, 1942, Serial No. 431,666

16 Claims. (Cl. 260—671)

This is a continuation-in-part of my co-pending application Serial No. 391,099, filed April 30, 1941, now U. S. Patent No. 2,290,211, issued July 21, 1942.

This invention relates to the treatment of aromatic compounds to produce alkylated aromatic compounds. More specifically it is concerned with the production of mono-alkylated and poly-alkylated aromatic hydrocarbons in the presence of a catalyst.

It is recognized that in general the catalytic alkylation of aromatic hydrocarbons has been known for some time. However, the present invention differentiates from the prior art on this subject in the use of a particular catalytic material comprising as its active ingredient an acid phosphate of an alkaline earth metal.

In one specific embodiment the present invention comprises a process for producing alkylated aromatic hydrocarbons which comprises subjecting an aromatic hydrocarbon and an alkoxy compound to contact under alkylating conditions in the presence of a catalyst comprising as its active ingredient an acid phosphate of an alkaline earth metal.

Aromatic hydrocarbons, such as benzene, toluene, other alkylated benzenes, naphthalene, alkylated naphthalenes, and other poly-nuclear aromatic hydrocarbons, which are alkylated by alkoxy compounds comprising alcohols, ethers, and esters as hereinafter set forth, may be obtained by the distillation of coal, by the dehydrogenation and/or cyclization of aliphatic hydrocarbons, alkylated aromatic hydrocarbons, and alkylated naphthenic hydrocarbons, and by other means.

Alkoxy compounds utilizable as alkylating agents in the process of the present invention comprise organic compounds of the class consisting of alcohols, ethers, and esters and particularly aliphatic alcohols, ethers, and esters which are represented by the general formula: ROQ, wherein R corresponds to an alkyl radical, O represents an oxygen atom, and Q corresponds to a member selected from the group consisting of hydrogen, a hydrocarbon radical such as alkyl, aryl or naphthyl, and an acid group particularly of a mono-carboxylic acid. In the latter case Q represents a group of the type of formyl, acetyl, propionyl, etc. Other esters which serve as a suitable source of alkyl groups comprise esters of mineral acids such as the alkyl sulfates and alkyl esters of acids of phosphorus which are also considered as alkoxy compounds in the present instance. Other compounds which may be utilized as alkylating agents and can be considered as alkoxy compounds, are the glycols. The different alkoxy compounds utilizable in the process of this invention are believed to have the common property of producing olefinic compounds as intermediates, or at least as transient intermediates, during the course of the reactions which result in the formation of alkylated aromatic hydrocarbons. Thus alcohols, particularly those containing at least 2 carbon atoms per molecule, and the corresponding ethers are capable of undergoing dehydration or splitting reactions to form olefinic hydrocarbons, which may be considered as present in the reaction mixture, possibly only as transient intermediate compounds, and these olefinic hydrocarbons are believed to react further with aromatic hydrocarbons to produce mono-alkylated and more-highly alkylated aromatic hydrocarbons.

Catalysts used in effecting the process of the present invention comprise acid phosphates of alkaline earth metals and particularly the mono-alkaline earth acid phosphates (also termed the di-hydro-phosphates) of calcium, strontium, and barium. As an example of these salts, the mono-calcium salt of ortho phosphoric acid is represented by the formula $Ca(H_2PO_4)_2 \cdot H_2O$ for the hydrated salt or as $Ca(H_2PO_4)_2$ when water of hydration is absent. An acid salt of an acid of phosphorus and an alkaline earth metal may be used as such or it may be mixed with or deposited upon carriers or supporting materials such as silica, diatomaceous earth, alumina, silica-alumina composites, crushed porcelain, pumice, firebrick, etc.

A composite of an acid phosphate of an alkaline earth metal and a carrier in finely powdered form, after thorough mechanical mixing, may be subjected to drying, pelleting, and heating operations to produce formed particles of catalyst suitable for use as reactor packing material, or the alkaline earth acid phosphate itself may be similarly formed into pellets or granules. A suitable carrier may also be impregnated with a selected acid phosphate to form a composite catalyst suitable for use in promoting interaction of aromatic hydrocarbons and alkoxy compounds. A suitable catalytic material may be prepared by adding to di-calcium phosphate or tri-calcium phosphate the calculated amount of orthophosphoric acid to form a composite with a composition corresponding to that of mono-calcium phosphate. Thus addition of phosphoric acid to a phosphate of an alkaline earth metal forms a catalyst of desired alkylating activity, but in general an acid phosphate containing substantially no free phosphoric acid has sufficient activity for catalyzing the process as herein described. The different alkylating catalysts which may be employed in the present process are not necessarily equivalent in their action.

Further, when an acid phosphate is used in connection with a carrier, the proportions of carrier and active ingredient may be varied as desired to make catalyst composites of different activities. Accordingly, catalytic material of appropriate activity is thus available for use with aromatic and alkoxy compounds of different reactivities.

There is relatively little formation of carbon or hydrocarbonaceous material upon the present types of catalyst when the reactions between aromatic and alkoxy compounds are carried out under hydrogen pressure, but formation of catalyst-contaminating material does occur to a substantial extent in the absence of hydrogen.

In effecting reaction between aromatic compounds, particularly aromatic hydrocarbons, and an alkoxy alkylating agent as an alcohol, ether, or ester according to the process of the present invention, the exact method of procedure varies with the nature of the reacting constituents. A simple procedure, utilizable in the case of an aromatic hydrocarbon which is normally liquid or if solid is readily soluble or easily dispersible in a substantially inert liquid and a normally liquid alkylating agent consists in contacting the reacting substances with a catalyst containing an acid phosphate of an alkaline earth metal and maintained at a temperature of from about 200° to about 450° C. and preferably at a temperature between about 250° and about 400° C. under a pressure which is generally not in excess of about 300 atmospheres and usually from about 10 to about 100 atmospheres. Intimate contact of the reacting components with the catalyst may be effected by passing the reaction mixture through a fixed bed of granular or pelleted catalyst or the reacting components may be mixed with finely divided catalyst and reacted in either a batch or continuous type of operation. The reaction mixture preferably contains a molar excess of aromatic compound relative to the molar proportion of alkoxy compound introduced thereto in order to avoid formation of olefin polymers which sometimes occurs if the alkoxy compound is present in excess of the aromatic compound. The excess of aromatic compound such as aromatic hydrocarbon also aids in controlling the reaction so as to produce a relatively large proportion of mono-alkylated material and to diminish the formation of poly-alkylated compounds.

In a typical operation of the process of this invention a normally liquid aromatic hydrocarbon and a normally liquid alkoxy compound are commingled and the resultant commingled mixture is passed through a reactor containing an acid phosphate of an alkaline earth metal such as mono-calcium acid phosphate, or at least a portion of the aromatic hydrocarbon is charged to such a reactor while the fraction containing an alkoxy compound, as such or preferably diluted by another portion of the aromatic hydrocarbon being treated, is introduced at various points between the inlet and the outlet of the reaction zone in such a manner that the reaction mixture being contacted with the catalyst will at all times contain a relatively low proportion of the alkoxy compound and thus favor formation of mono-alkylated aromatic hydrocarbons rather than of more-highly alkylated aromatic hydrocarbons. The gradual introduction of the olefin-producing substance throughout the reaction zone also has a tendency to diminish the formation of olefin polymers which sometimes result when alkoxy compounds as alcohols and ethers rapidly undergo dehydration reactions in the presence of the catalysts herein described.

While the method of passing the aromatic and alkoxy compounds, either together or countercurrently, through a suitable reactor containing the granular catalyst is generally customary procedure, the interaction of these organic compounds may also be effected in a closed vessel in which the reacting components are in liquid phase and in which the catalyst is preferably in finely divided or powdered form and is maintained in dispersion or suspension by some method of agitation. The choice of operating procedure is dependent upon the circumstances such as the temperature, pressure, and activity of the catalyst found to be effective for producing the desired reaction between particular mono-nuclear or poly-nuclear aromatic and alkoxy compounds, the latter comprising compounds such as aliphatic alcohols, ethers, and esters.

Acid phosphates of alkaline earth metals as herein described are preferred catalysts for use in the production of alkylated aromatic hydrocarbons as they permit continuous reaction in the presence of a fixed bed of catalyst and thus make it possible to avoid mechanical problems as well as oxidation and corrosion difficulties encountered when this reaction is carried out in the presence of sulfuric acid which is sometimes used as an alkylating catalyst. Further, an acid phosphate such as calcium acid phosphate also has an advantage over aluminum chloride utilizable for the same purpose in that an acid phosphate forms substantially no addition compounds, complexes, or sludges with aromatic hydrocarbons and alkoxy compounds as is characteristic of catalysts containing aluminum chloride.

The reaction products obtained by treating an aromatic hydrocarbon with an alkoxy compound according to the process of this invention consist of hydrocarbons together with certain amounts of water or an organic acid. The product contains water in case the alkoxy compound is an alcohol or an ether, while an organic acid is present when the alkoxy compound charged consists of an alkyl ester of an organic acid.

In general, the hydrocarbon products formed by interaction of an alkoxy compound with a molar excess of an aromatic hydrocarbon are separated from the unreacted aromatic hydrocarbon by suitable means as by distillation, and the unreacted portion of the aromatic hydrocarbon originally charged, and generally the poly-alkylated aromatic hydrocarbons formed, are returned to the process and mixed with additional quantities of the aromatic hydrocarbon and alkoxy compound being charged to contact with the catalyst. This recycling of poly-alkylated aromatic hydrocarbons sometimes aids in the production of mainly mono-alkylated aromatic hydrocarbons and in depressing the formation of more-highly alkylated derivatives. The total alkylated product thus freed from the excess of the originally charged aromatic hydrocarbon is separated into desired fractions by distillation at ordinary or reduced pressure or by other suitable means.

While the process of this invention is particularly applicable to the production of alkylated aromatic hydrocarbons from aromatic hydrocarbons and alkoxy compounds, it may be utilized also in alkylating other aromatic compounds as in converting phenols into alkylated phenols or in transforming halogenated aromatic hydrocarbons into alkylated halogenated aromatic hydrocarbons using a catalyst containing an acid phosphate of an alkaline earth metal and operating generally within the ranges of temperature and pressure hereinabove set forth.

The following example is given to illustrate the character of results obtained by the use of the present process, although the example given is not introduced with the intention of unduly restricting the generally broad scope of the invention.

80 parts by weight of benzene, 30 parts by weight of isopropyl alcohol, and 10 parts by weight of powdered mono-calcium phosphate were introduced to a rotatable autoclave and placed under an initial nitrogen pressure of 50 atmospheres after which the autoclave and contents were heated for 4 hours at 350° C. under a maximum pressure of 280 atmospheres.

At the end of the reaction after the autoclave was cooled to room temperature, the products were removed and found to consist of 96 parts by weight of a clear greenish-yellow liquid and 18 parts by weight of a white paste-like material consisting of used mono-calcium phosphate catalyst wetted by water, the latter being formed from the isopropyl alcohol during the reaction. Fractional distillation separated the liquid product into 5 parts by weight of hydrocarbons boiling lower than benzene, 54 parts by weight of unconverted benzene, 3 parts by weight of an intermediate fraction, 38 parts by weight of mono-isopropyl benzene, and 6 parts by weight of higher boiling aromatic hydrocarbons containing a relatively large proportion of para-di-isopropyl benzene.

The nature of the present invention and its commercial utility can be seen from the specification and example given, although neither section is intended to limit its generally broad scope.

I claim as my invention:

1. A process for producing aromatic compounds having a higher number of carbon atoms per molecule than the aromatic compound from which they are derived which comprises subjecting an aromatic compound to contact with an alkoxy compound under alkylating conditions in the presence of a catalyst containing an acid phosphate of an alkaline earth metal.

2. A process for producing alkylated aromatic compounds which comprises subjecting an aromatic compound and an alkoxy compound to contact under alkylating conditions in the presence of a catalyst containing an acid phosphate of an alkaline earth metal.

3. A process for producing alkylated aromatic hydrocarbons which comprises subjecting an aromatic hydrocarbon and an alkoxy compound to contact under alkylating conditions in the presence of a catalyst comprising essentially an acid phosphate of an alkaline earth metal.

4. A process for producing alkylated aromatic hydrocarbons which comprises subjecting an aromatic hydrocarbon and an alkoxy compound to contact at a temperature of from about 200° to about 450° C. in the presence of a catalyst comprising essentially an acid phosphate of an alkaline earth metal.

5. A process for producing alkylated aromatic hydrocarbons which comprises subjecting an aromatic hydrocarbon and an alkoxy compound to contact at a temperature of from about 200° to about 450° C. under a pressure of from substantially atmospheric to approximately 300 atmospheres in the presence of a catalyst comprising essentially an acid phosphate of an alkaline earth metal.

6. A process for producing alkylated aromatic hydrocarbons which comprises subjecting an aromatic hydrocarbon and an alkoxy compound to contact at a temperature of from about 200° to about 450° C. in the presence of a hydrogen-containing gas and of a catalyst comprising essentially an acid phosphate of an alkaline earth metal.

7. A process for producing alkylated aromatic hydrocarbons which comprises subjecting an aromatic hydrocarbon and an aliphatic alcohol to contact at a temperature of from about 200° to about 450° C. under a pressure of from substantially atmospheric to approximately 300 atmospheres in the presence of a catalyst comprising essentially an acid phosphate of an alkaline earth metal.

8. A process for producing alkylated aromatic hydrocarbons which comprises subjecting an aromatic hydrocarbon and an aliphatic ether to contact at a temperature of from about 200° to about 450° C. under a pressure of from substantially atmospheric to approximately 300 atmospheres in the presence of a catalyst comprising essentially an acid phosphate of an alkaline earth metal.

9. A process for producing alkylated aromatic hydrocarbons which comprises subjecting an aromatic hydrocarbon and an alkyl ester of an aliphatic mono-carboxylic acid to contact at a temperature of from about 200° to about 450° C. under a pressure of from substantially atmospheric to approximately 300 atmospheres in the presence of a catalyst comprising essentially an acid phosphate of an alkaline earth metal.

10. A process for producing alkylated aromatic hydrocarbons which comprises subjecting an aromatic hydrocarbon and an alkoxy compound to contact at a temperature of from about 200° to about 450° C. under a pressure of from substantially atmospheric to approximately 300 atmospheres in the presence of a catalyst comprising essentially a calcium acid phosphate.

11. A process for producing alkylated aromatic hydrocarbons which comprises subjecting an aromatic hydrocarbon and an alkoxy compound to contact at a temperature of from about 200° to about 450° C. under a pressure of from substantially atmospheric to approximately 300 atmospheres in the presence of a catalyst comprising essentially a strontium acid phosphate.

12. A process for producing alkylated aromatic hydrocarbons which comprises subjecting an aromatic hydrocarbon and an alkoxy compound to contact at a temperature of from about 200° to about 450° C. under a pressure of from substantially atmospheric to approximately 300 atmospheres in the presence of a catalyst comprising essentially a barium acid phosphate.

13. A process for producing alkylated aromatic hydrocarbons which comprises subjecting an aromatic hydrocarbon and an alkoxy compound to contact at a temperature of from about 200° to about 450° C. under a pressure of from substantially atmospheric to approximately 300 atmospheres in the presence of a catalyst comprising essentially calcium dihydrophosphate.

14. A process for producing alkylated benzene which comprises subjecting benzene and an alkoxy compound to contact at a temperature of from about 200° to about 450° C. under a pressure of from substantially atmospheric to approximately 300 atmospheres in the presence of a catalyst comprising essentially calcium dihydrophosphate.

15. A process for producing ethylated benzene which comprises subjecting benzene and an ethoxy compound to contact at a temperature of from about 200° to about 450° C. under a pressure of from substantially atmospheric to approximately 300 atmospheres in the presence of a catalyst comprising essentially calcium dihydrophosphate.

16. A process for producing alkylated aromatic hydrocarbons which comprises subjecting an aromatic hydrocarbon and an alkoxy compound to contact at a temperature of from about 200° to about 450° C. in the presence of a composite of an acid phosphate of an alkaline earth metal and a substantially inert carrier.

RAYMOND E. SCHAAD.